United States Patent
Oaki

(10) Patent No.: US 9,156,166 B2
(45) Date of Patent: Oct. 13, 2015

(54) ROBOT CONTROL DEVICE

(71) Applicant: KABUSHIKI KAISHA TOSHIBA, Minato-ku, Tokyo (JP)

(72) Inventor: Junji Oaki, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/448,292

(22) Filed: Jul. 31, 2014

(65) Prior Publication Data
US 2015/0039128 A1 Feb. 5, 2015

(30) Foreign Application Priority Data
Aug. 5, 2013 (JP) .................................. 2013-162782

(51) Int. Cl.
G05B 19/04 (2006.01)
G05B 19/18 (2006.01)
B25J 9/00 (2006.01)
B25J 9/16 (2006.01)

(52) U.S. Cl.
CPC .............. *B25J 9/1651* (2013.01); *B25J 9/1638* (2013.01); *B25J 9/1641* (2013.01); *B25J 9/1653* (2013.01); *G05B 2219/41392* (2013.01); *G05B 2219/41398* (2013.01)

(58) Field of Classification Search
USPC ............... 700/245, 29, 28, 32, 250, 252, 262; 901/2, 28, 31, 8, 14, 15, 19, 20, 22, 30, 901/32, 36, 38, 23
See application file for complete search history.

(56) References Cited

U.S. PATENT DOCUMENTS

| | | | |
|---|---|---|---|
| 4,894,595 A * | 1/1990 | Sogawa et al. ........... | 318/568.24 |
| 6,472,839 B1 * | 10/2002 | Ishii et al. ................ | 318/568.12 |
| 6,684,128 B1 | 1/2004 | Tounai et al. | |
| 7,765,023 B2 | 7/2010 | Oaki et al. | |

(Continued)

FOREIGN PATENT DOCUMENTS

| | | |
|---|---|---|
| JP | 07-060667 | 3/1995 |
| JP | 7-120212 A | 12/1995 |

(Continued)

OTHER PUBLICATIONS

Kobayashi et al.; "Actuals of Robot Control": Chapter 3, Identification Method of Robot; Corona Publishing Company, 1997, pp. 62-85.

(Continued)

*Primary Examiner* — Ronnie Mancho
(74) *Attorney, Agent, or Firm* — Amin, Turocy & Watson, LLP

(57) ABSTRACT

A robot control device according to an embodiment includes: an observer receiving the angular velocity of the motor and the current command value, and estimating an angular acceleration of the link, and angular velocities of the link and the motor from a simulation model of an angular velocity control system of the motor; a first feedback unit calculating an axis torsion angular velocity from a difference between the angular velocities of the link and the motor estimated by the observer, and giving feedback to the angular velocity control system; a second feedback unit feeding back the angular acceleration of the link estimated by the observer to the angular velocity control system; and a first feedback constant calculating unit compensating an end effector load mass and increases inertia at the second feedback unit when an end effector load in the nonlinear dynamic model has low inertia.

6 Claims, 13 Drawing Sheets

(56) References Cited

U.S. PATENT DOCUMENTS

| | | | |
|---|---|---|---|
| 8,733,810 B2* | 5/2014 | Oda | 294/86.4 |
| 8,838,273 B2* | 9/2014 | Hvass et al. | 700/253 |
| 8,849,455 B2* | 9/2014 | Izumi et al. | 700/254 |
| 8,977,378 B2* | 3/2015 | Weinberg et al. | 700/120 |
| 8,989,904 B2* | 3/2015 | Dreslinski et al. | 700/264 |
| 2009/0204259 A1* | 8/2009 | Danko | 700/250 |

FOREIGN PATENT DOCUMENTS

| | | |
|---|---|---|
| JP | 2772064 | 4/1998 |
| JP | 2772064 B2 | 7/1998 |
| JP | 2004-260891 A | 9/2004 |
| JP | 2005-120212 A | 5/2005 |
| JP | 2005-242794 A | 9/2005 |
| JP | 2005-349555 A | 12/2005 |
| JP | 2006-116631 | 5/2006 |
| JP | 2006-116631 A | 5/2006 |
| JP | 2014-34101 A | 2/2014 |

OTHER PUBLICATIONS

Sugimoto et al.; "Theory and Actual Design of AC Servo System", Chapter 7, Design of Velocity Control System and Position Control System; Sougou-denshi-shuppansha, 1990, pp. 153-179.

Takesue et al.; "A Consideration on Inertia-Ratio an Damping Property of Vibration of Two-Inertia System"; IEEJ, D. vol. 121, 3, 2001, pp. 283-284.

Extended European Search Report for European Patent Application No. 14178734.1 mailed on Jan. 14, 2015.

Moatemri, Moncef H., et al.; Implementation of a DSP-Based, Acceleration Feedback Robot Controller: Practical Issues and Design Limits; Proceedings of the Industry Applications Society Annual Meeting; Sep. 28-Oct. 1, 1991; pp. 1425-1430; vol. 2, IEEE, New York, United States.

Oaki, Junji, et al.; Decoupling Identification Method of Serial Two-link Two-inertia System for Robot Motion Control; 18th IFAC World Congress; Aug. 28-Sep. 2, 2011; pp. 14359-14366; IFAC; Milano; Italy.

* cited by examiner

ROBOT CONTROL DEVICE

CROSS REFERENCE TO RELATED APPLICATIONS

This application is based upon and claims the benefit of priority from the prior Japanese Patent Application No. 2013-162782, filed on Aug. 5, 2013, the entire contents of which are incorporated herein by reference.

FIELD

Embodiments described herein relate generally to robot control devices.

BACKGROUND

To suppress vibration of the distal end of a mufti-link robot, an axis torsion angular velocity (the difference between a link angular velocity and a motor angular velocity) needs to be estimated from a motor angular velocity measured by an encoder installed in a motor that drives respective axes, and be fed back to a motor angular velocity control system. In the estimation, it is required that a nonlinear observer based on a nonlinear dynamic model takes into account elastic joints, and the nonlinear interference forces acting between the links.

To realize such a mufti-input/output nonlinear observer, an accurate dynamic model needs to be built, and robustness to variations in payload and friction-torque is required. Conventionally, an approximative observer based on a one-input/output linear model that performs "disturbance estimation from another link and compensation in the elastic joint model at each one link" is normally used so as to reduce the amount of calculation in control operations.

As CPUs and memories have improved in performance in recent years, a robot control device can now have the benefit of increased computing power and large memory capacities.

However, since such an observer is based on approximation, the vibration suppression effect is not robust, and on top of that, the engineering costs required for implementing control laws and adjusting control gains are enormous.

Also, as angular velocity sensors can be readily obtained these days, it is possible to suppress vibration by mounting an angular velocity sensor on each of the links of a robot arm, directly measuring axis torsion angular velocities, and performing feedback. However, this technique requires a larger number of wirings, resulting in a problem such as a high cost in some cases.

Furthermore, in a vibration suppression control system that performs feedback of axis torsion angular velocities, there is a problem of a decrease in the damping effect of the vibration suppression control when the end effector load is small or has low inertia, regardless of whether the axis torsion angular velocities are estimated by a state observer or are directly measured.

DETAILED DESCRIPTION

According to an embodiment, there is provided a robot control device that controls a robot arm having an elastic mechanism between a rotation axis of a motor and a rotation axis of a link, and has an angular velocity control system that performs proportionality/integration control on an angular velocity of the motor and outputs a current command value to the motor, the robot control device comprising: an observer configured to receive the angular velocity of the motor and the current command value as inputs, have a nonlinear dynamic model of the robot arm, and estimate an angular acceleration of the link, an angular velocity of the link, and an angular velocity of the motor from a simulation model of an angular velocity control system of the motor subjected to proportionality/integration control using a gain equivalent to the angular velocity control system; a first feedback unit configured to calculate an axis torsion angular velocity from a difference between the angular velocity of the link estimated by the observer and the angular velocity of the motor estimated by the observer, and give feedback to the angular velocity control system; a second feedback unit that feeds back the angular acceleration of the link estimated by the observer to the angular velocity control system; and a first feedback constant calculating unit that compensates an end effector load mass and increases inertia at the second feedback unit when an end effector load in the nonlinear dynamic model has low inertia.

The following is a detailed description of embodiments, with reference to the accompanying drawings.

The circumstances leading to the embodiments are first described before the respective embodiments are explained.

Figure 1:
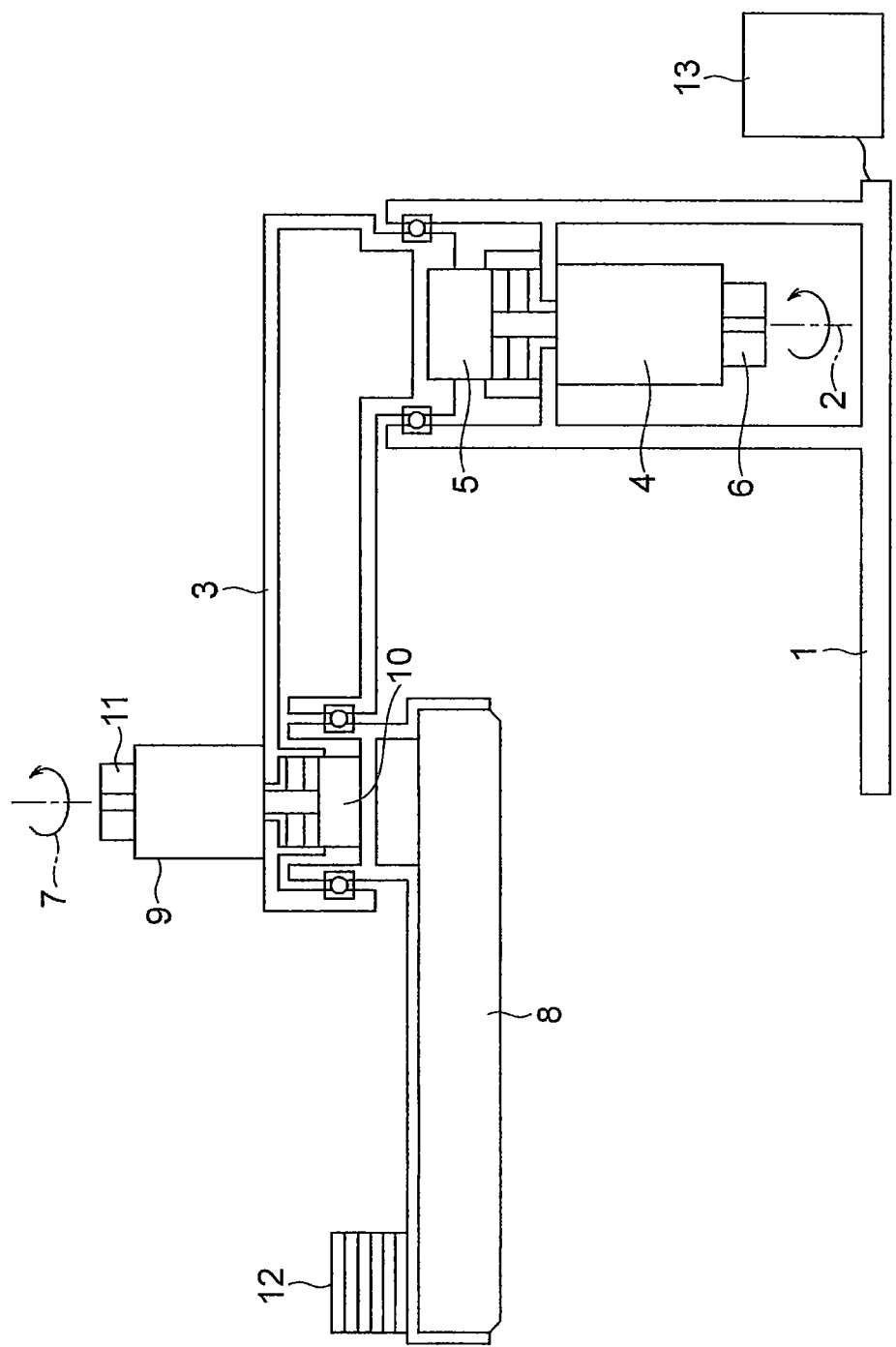
FIG. 1 is a cross-sectional view of a robot arm that is an example object to be controlled by a robot control device according to a first embodiment.

FIG. 1 is a cross-sectional view of a two-link robot arm that is an example object to be controlled by a robot control device according to each embodiment. This robot arm includes a mount 1, a first link 3, a first motor 4, a first reduction gear 5, a first encoder 6, a second link 8, a second motor 9, a second reduction gear 10, and a second encoder 11. One end of the first link 3 is attached to an upper portion of the mount 1, and the second link 8 is attached to the other end of the first link 3. A load 12 is applied the end of the second link 8.

A control device 13 causes the first link 3 to rotate about a first axis 2 horizontally with respect to the mount 1 by virtue of a combination of the first motor 4, the first encoder 6, and the first reduction gear 5 having spring properties. The control device 13 also causes the second link 8 to rotate about a second axis 7 horizontally with respect to the first link 3 by virtue of a combination of the second motor 9, the second encoder 11, and the second reduction gear 10 having spring properties.

Figure 2:
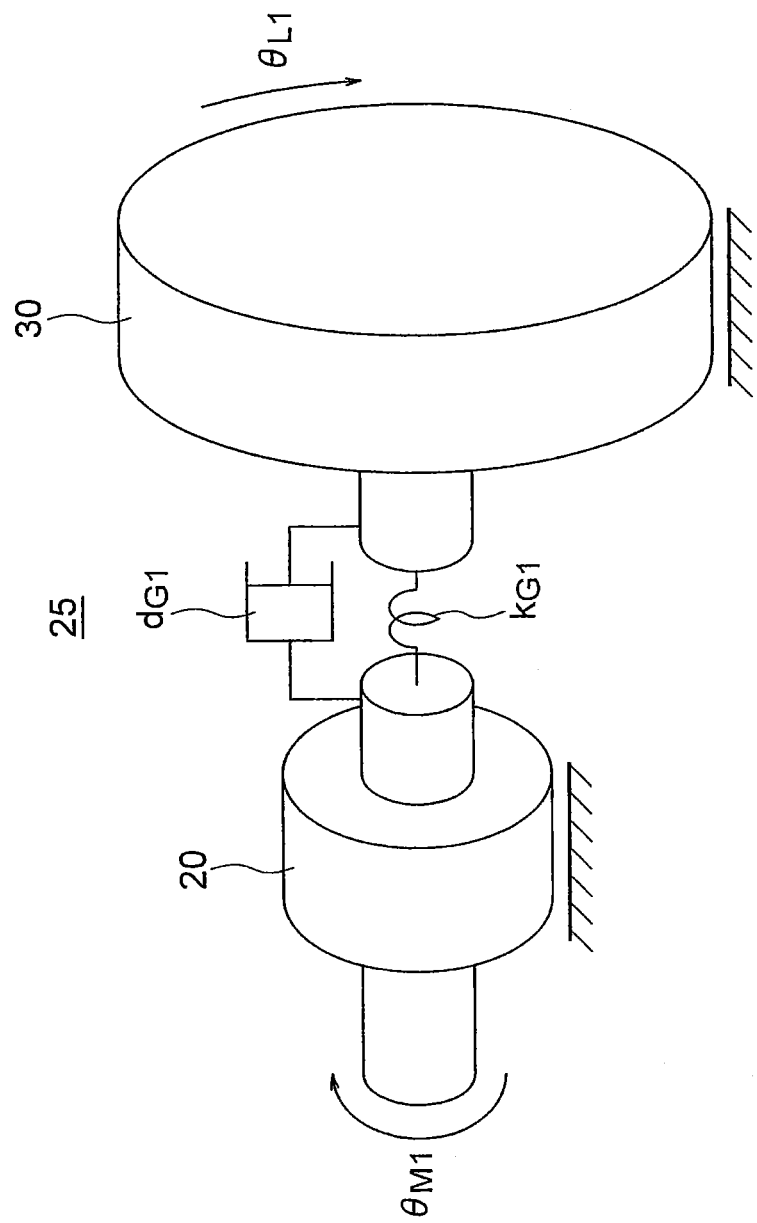
FIG. 2 is a schematic view of one link of the robot arm shown in FIG. 1.

FIG. 2 is a schematic view of one link of this robot arm. This is called a two-inertia system. Referring to FIGS. 1 and 2, this robot arm can be turned as a serial two-link arm having elastic joints into a nonlinear dynamic model. In FIG. 2, the first axis is shown as a typical example, in terms of the physical parameters, such as moments of inertia, friction coefficients, and spring coefficients, which are necessary for describing a nonlinear dynamic model of a link. In the example shown in FIG. 2, a link 30 is driven and controlled by a motor 20 via a reduction gear 25. As the physical parameters of the first axis, the torque input to the motor 20 is represented by $u_1$, the moment of inertia of the motor 20 is represented by $m_{M1}$, the rotation angle of the motor 20 or the output detected by an encoder is represented by $\theta_{M1}$, the viscous friction coefficient of the motor 20 is represented by $d_{M1}$, the Coulomb friction torque of the motor 20 is represented by $f_{M1}$, the damping coefficient of the reduction gear 25 is represented by $d_{G1}$, the spring coefficient of the reduction gear 25 is represented by $k_{G1}$, the moment of inertia of the link 30 is represented by $m_{L1}$, the viscous friction coefficient of the link 30 is represented by $d_{L1}$, and the rotation angle of the link 30 is represented by $\theta_{L1}$.

The nonlinear dynamic model of the serial two-link arm having elastic joints is expressed by equation (1) on the motor side, and is expressed by equation (2) on the link side.

$$M_M \ddot{\theta}_M + D_M \dot{\theta}_M + f_M \mathrm{sgn}(\dot{\theta}_M) = \\ E_u - N_G[K_G(N_G \theta_M - \theta_L) + D_G(N_G \dot{\theta}_M - \dot{\theta}_L)] \quad (1)$$

$$M_L(\theta_L)\ddot{\theta}_L + c_L(\dot{\theta}_L, \theta_L) + D_L \dot{\theta}_L = K_G(N_G \theta_M - \theta_L) + D_G(N_G \dot{\theta}_M - \dot{\theta}_L) \quad (2)$$

In the above equations,
$\theta_M = [\theta_{M1}, \theta_{M2}]^T$: the rotation angle of the motor (the suffixes 1 and 2 being the axis numbers),
$\theta_L = [\theta_{L1}, \theta_{L2}]^T$: the rotation angle of the link,
$\alpha = [\alpha_1, \alpha_2]^T$: the translational acceleration of the link,
$M_L(\theta_L) \in R^{2 \times 2}$: the inertia matrix of the link,
$C_L(d\theta_L/dt, \theta_L) \in R^{2 \times 1}$: the centrifugal force and the Coriolis force vector,
$M_M = \mathrm{diag}(m_{M1}, m_{m2})$: the high gear inertia of the motor and the reduction gear,
$D_M = \mathrm{diag}(d_{M1}, d_{M2})$: the viscous friction coefficient of the motor axis,
$D_L = \mathrm{diag}(d_{L1}, d_{L2})$: the viscous friction coefficient of the link axis,
$K_G = \mathrm{diag}(k_{G1}, k_{G2})$: the spring coefficient of the reduction gear,
$D_G = \mathrm{diag}(d_{G1}, d_{G2})$: the damping coefficient of the reduction gear,
$N_G = \mathrm{diag}(n_{G1}, n_{G2})$: the reduction ratio ($n_{G1}, n_{G2} \leq 1$),
$f_M = [f_{M1}, f_{M2}]^T$: the Coulomb friction torque of the motor axis,
$E = \mathrm{diag}(e_1, e_2)$: the torque/voltage (current command value) constant, and
$u = [u_1, u_2]^T$: the input voltage (the value of the command to the motor current control system).

Here, sgn(a) in equation (1) represents a sign function, and has a value of 1, −1, or 0 depending on the value of a, which is a positive value, a negative value, or 0. Also, diag(a, b) represents a diagonal matrix that has a and b as the diagonal matrix elements.

Where $\alpha$, $\beta$, and $\gamma$ are base parameters formed with the length, the position of the center of gravity, the mass, and the inertia of the link, the inertia matrix of the link is expressed as shown in equation (3).

$$M_L(\theta_L) = \begin{bmatrix} \alpha + \beta + 2\gamma \cos(\theta_{L2}) & \beta + \gamma \cos(\theta_{L2}) \\ \beta + \gamma \cos(\theta_{L2}) & \beta \end{bmatrix} \quad (3)$$

The above base parameters are specifically expressed as shown in following expressions (4).

$\alpha = m_1 l_{g1}^2 + I_{z1} + m_2 l_1^2$ $\beta = m_2 l_{g2}^2 + I_{z2}$ $\gamma = m_2 l_1 l_{g1} \quad (4)$ In the above equations (4),
$l_i$: the length of each link (i being the axis number),
$m_i$: the mass of each link,
$l_{gi}$: the position of the center of gravity of each link (each link being symmetrical in the longitudinal direction), and
$I_{zi}$: the moment of inertia around the center of gravity of each link.

When an end effector load 12 varies, the mass $m_2$ of the link to which this end effector load 12 is applied varies, and all of the base parameters $\alpha$, $\beta$, and $\gamma$ vary.

The centrifugal force and the Coriolis force vector are expressed as shown in equation (5).

$$c_L(\dot{\theta}_L, \theta_L) = \begin{bmatrix} -\gamma(2\dot{\theta}_{L1}\dot{\theta}_{L2} + \dot{\theta}_{L2}^2)\sin(\theta_{L2}) \\ \gamma \dot{\theta}_{L1}^2 \sin(\theta_{L2}) \end{bmatrix} \quad (5)$$

As for the motor angular velocity control system, equation (6) that expresses two-degree-of-freedom PI control by showing PI (proportionality/integration) control as FF-I-P (feedforward-integration-proportionality) control is used in the basic configuration.

$$u_i = k_{FVi}\dot{\theta}_{MRi} + k_{IVi}\int (\dot{\theta}_{MRi} - \dot{\theta}_{Mi})dt - k_{PVi}\dot{\theta}_{Mi} \, (i=1,2) \quad (6)$$

In equation (6),
$d\theta_{MRi}/dt$: the target value of the angular velocity of the motor (i being the axis number)
$d\theta_{Mi}/dt$: the angular velocity of the motor,
$k_{FVi}$: the feedforward control gain of the target value of the angular velocity of the motor,
$k_{IVi}$: the feedback control gain of the deviation integral of the angular velocity of the motor,
$k_{PVi}$: the feedback control gain of the proportionality of the angular velocity of the motor, and
$u_i$: the input voltage (the value of the command (torque input) to the motor current control system).

Figure 3:
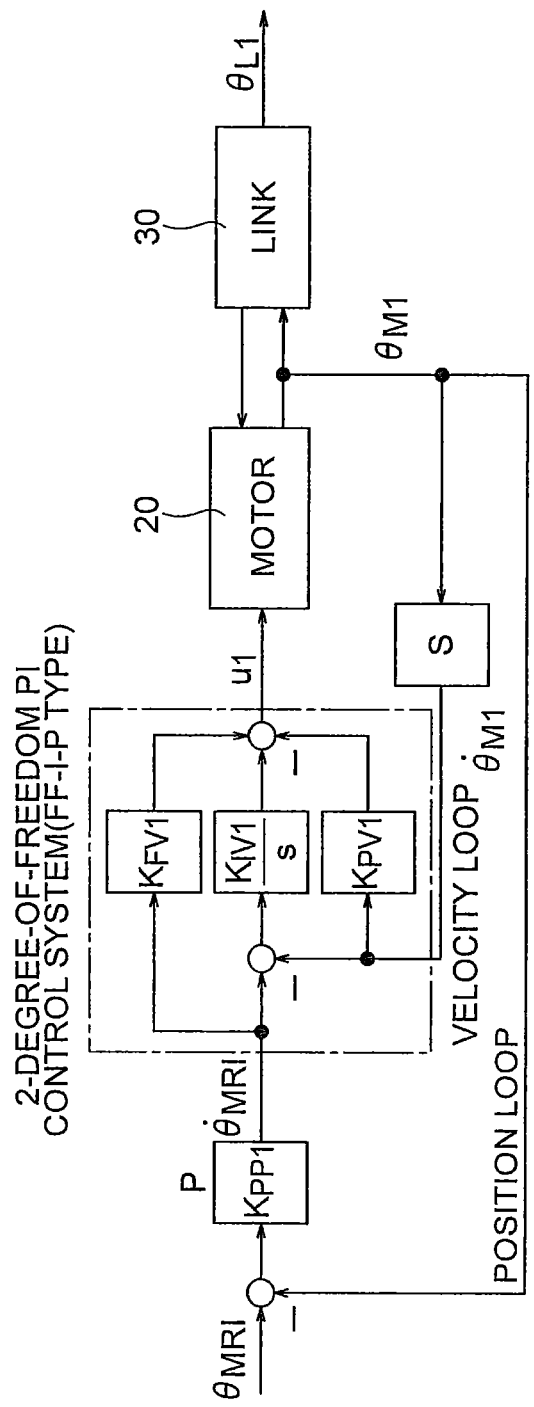
FIG. 3 is a block diagram showing general positions and a velocity control system.

As shown in FIG. 3, this two-degree-of-freedom PI velocity control system is designed as control systems that are cascade-connected in the position control system (P control). FIG. 3 shows the two-degree-of-freedom PI velocity control system for the first axis.

In the description below, attention is focused on the angular velocity control system of the motor minus the position control system, and the angular velocity control system of the motor is described as a continuous system where the control cycle is assumed to be reasonably short.

First, the end effector load 12 of the two-link arm shown in FIG. 1 is set at 5 kg, for example, and the physical parameters (hereinafter including the base parameters $\alpha$, $\beta$, and $\gamma$) shown in equation (1) are estimated by using a known identification method. This identification method may be the identification method disclosed in Non-Patent Document 1 (Kobayashi et al., ACTUALS OF ROBOT CONTROL, Chapter 3, Identification Method of Robot, Corona publishing company, 1997, pp. 62-85), an identification method that takes into account the joint rigidity of the robot model as disclosed in JP-2772064B, or the like.

Those estimated physical parameters as well as the motor velocity control gain are substituted into equation (1) expressing the dynamic model and equation (6) expressing the velocity feedback control law. As a result, a time response simulator of a velocity control system of a serial two-link arm is built, and a check is made to determine whether the time response simulator is in synchronization with the time response of the actual robot.

Figure 4:
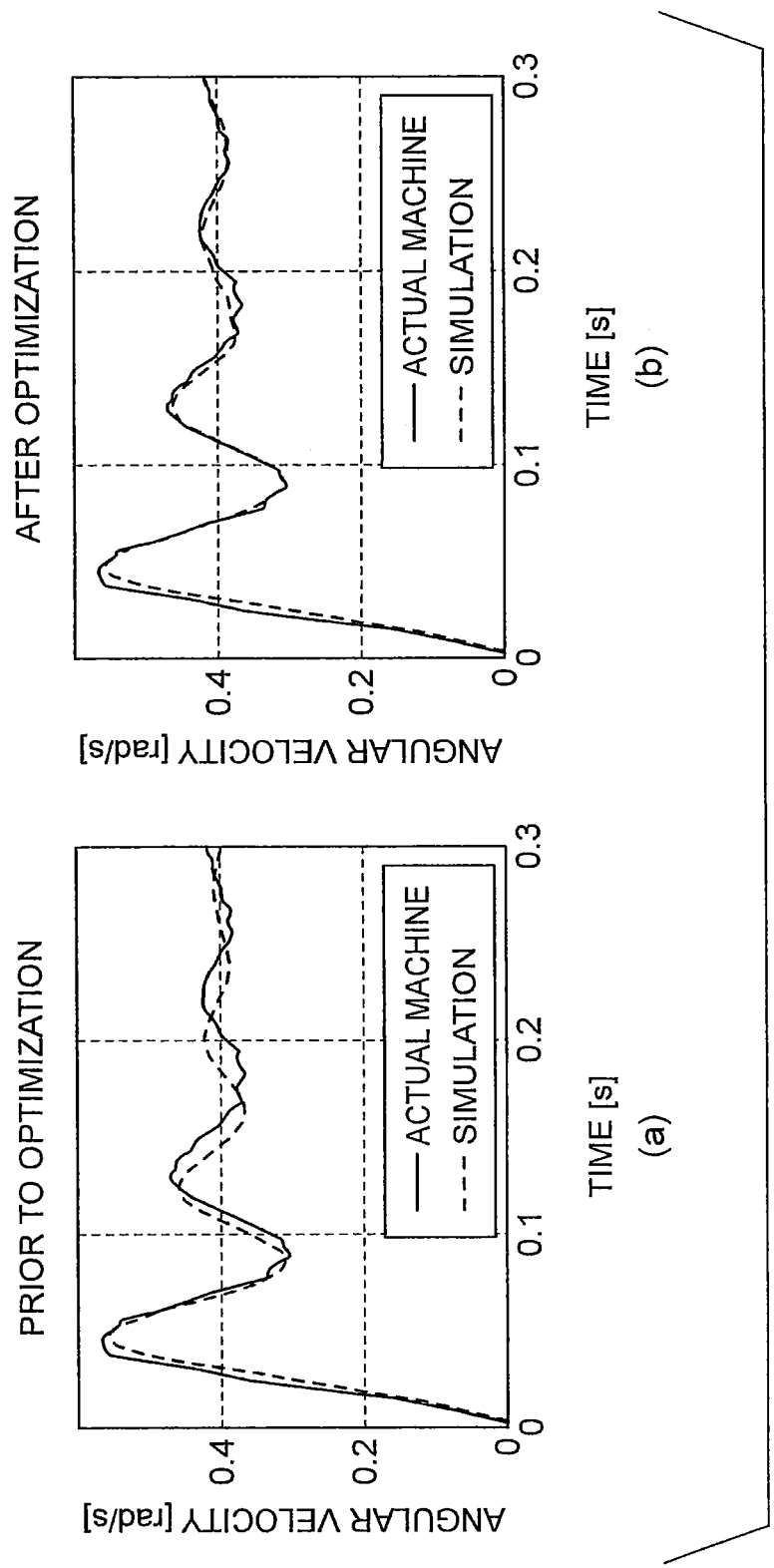
FIGS. 4(a) and 4(b) are diagrams showing fine tuning of a physical parameter using nonlinear optimization.

If the physical parameters are accurately estimated by the above identification method, those time responses should be in synchronization with each other. If the time responses are out of synchronization by a small amount, the physical parameters are finely tuned by using an optimization calculation according to the nonlinear least-squares method (such as the Levenberg-Marquardt method) using the above time response simulator. FIG. 4(a) shows an example of the angular velocity step response prior to optimization, and FIG. 4(b) shows an example of the angular velocity step response after the optimization. In each of FIGS. 4(a) and 4(b), the abscissa axis indicates time, the ordinate axis indicates angular velocity, the solid line indicates the response of the actual robot, and the dashed line indicates the result of the response of the simulator. As can be seen from FIG. 4(b), the simulator and the actual robot can have similar angular velocity step responses to each other, as the physical parameters are optimized.

In view of this, in this embodiment, an observer that estimates angular velocities of links from angular velocities of motors measured by the encoder is built, and not only the measured values of angular velocities of the motors but also the estimated values of angular velocities of the links are fed back so that the robot arm is operated with high precision while vibration of the end of the robot arm is suppressed.

In a case where state feedback is performed by using values estimated by the observer, a feedback gain of the observer and a gain of the state feedback need to be set and adjusted. According to the modern control theory, feedback control is performed after a state variable is reproduced by the observer, and therefore, the poles of the observer are located much closer to the left half of the plane (the negative real part region) than the poles of the state feedback in a complex plane.

In practice, however, such a high gain cannot be set in an observer that has various kinds of noise and modeling errors. When the positions of the poles of the observer are adjusted in accordance with the response of the actual robot, the poles of the observer might be located close to the poles of the state feedback.

If a Kalman filter is used, an observer can be designed systematically. In that case, however, it is necessary to set parameters of an assumed noise model. Further, in robust control such as $H^\infty$ control (H-infinity control) that involves neither an observer nor state feedback, a control system can be designed by actually taking into account noise and modeling errors. However, any of the methods requires the use of a CAE (Computer-Aided Engineering) tool, and therefore, it is difficult to perform manual adjustment at the work site.

In view of the above, in each of the embodiments described below, attention is focused on the fact that time responses of a velocity-controlled actual robot and a simulation are similar to each other, and an observer that takes advantage of the high accuracy of estimates of the physical parameters is formed. Observers according to the respective embodiments are described below.

First Embodiment

Figure 5:
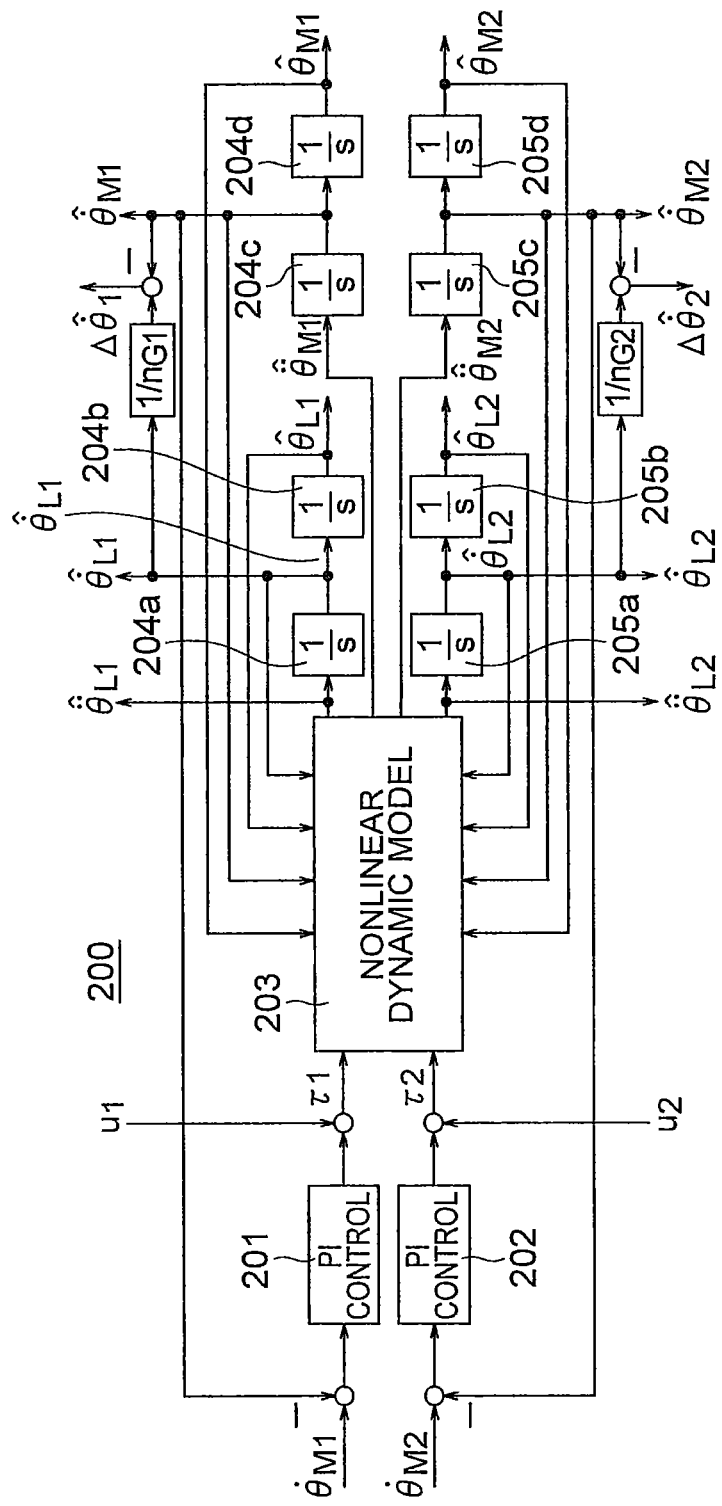
FIG. 5 is a block diagram showing the observer of the robot control device according to the first embodiment.

FIG. 5 shows an observer of a robot control device according to a first embodiment. The observer 200 of the first embodiment includes first-axis and second-axis PI controllers 201 and 202, a two-link arm nonlinear dynamic model 203, and integrators 204a, 204b, 204c, 204d, 205a, 205b, 205c, and 205d that integrate outputs of the nonlinear dynamic model 203. The PI controller 201 performs PI control based on the deviation of the velocity $d\theta_{M1}/dt$ of the motor that drives a first axis with respect to an estimated value of the rotation angle of the motor that drives the first axis. The PI controller 202 performs PI control based on the deviation of the velocity $d\theta_{M2}/dt$ of the motor that drives a second axis with respect to an estimated value of the rotation angle of the motor that drives the second axis. The two-link arm nonlinear dynamic model 203 estimates angular accelerations of first and second links based on the nonlinear dynamic model that is based on a first input $\tau_1$ that is the sum of an output of the PI controller 201 and a control input $u_1$ of the first axis, and a second input $\tau_2$ that is the sum of an output of the PI controller 202 and a control input $u_2$ of the second axis. The two-link arm nonlinear dynamic model 203 also estimates angular accelerations of the respective motors that drive the first and second links. The two-link arm nonlinear dynamic model 203 outputs the estimated angular accelerations.

The integrator 204a integrates the estimated value of the angular acceleration of the first link output from the nonlinear dynamic model 203, and outputs the estimated value of the angular velocity. The integrator 204b integrates the output of the integrator 204a, and outputs an estimated value of a rotation angle of the first link. The integrator 204c integrates the estimated value of the angular acceleration of the motor driving the first link, which is output from the nonlinear dynamic model 203, and outputs the estimated value of the angular velocity of the motor. The integrator 204d integrates the output of the integrator 204c, and outputs an estimated value of a rotation angle of the motor that drives the first link.

The integrator 205a integrates the estimated value of the angular acceleration of the second link, which is output from the nonlinear dynamic model 203, and outputs the estimated value of the angular velocity. The integrator 205b integrates the output of the integrator 205a, and outputs an estimated value of a rotation angle of the second link. The integrator 205c integrates the estimated value of the angular acceleration of the motor driving the second link, which is output from the nonlinear dynamic model 203, and outputs the estimated value of the angular velocity of the motor. The integrator 205d integrates the output of the integrator 205c, and outputs an estimated value of a rotation angle of the motor that drives the second link.

The estimated values of angular accelerations of the first and second links, the estimated values of angular velocities of the first and second link, the estimated values of angular velocities of the motors that drive the first and second links, and the estimated values of rotation angles of the motors are output from the observer 200.

Also, in the observer 200, an estimated value of a torsion angular velocity of the first link is calculated based on the estimated value of the angular velocity of the first link, the reduction ratio $n_{G1}$ of the reduction gear located between the first link and the motor that drives the first link, and the estimated value of the angular velocity of the motor that drives the first link. This estimated value is then output. Likewise, an estimated value of a torsion angular velocity of the second link is calculated based on the estimated value of the angular velocity of the second link, the reduction ratio $n_{G2}$ of the reduction gear located between the second link and the motor that drives the second link, and the estimated value of the angular velocity of the motor that drives the second link. This estimated value is then output.

This observer 200 of the first embodiment functions exactly like a simulator, as the observer 200 contains the entire robot arm nonlinear dynamic model 203, and the observer gains of the PI controllers 201 and 202 are the PI control gains of the existing velocity control systems of the respective axes of the robot arm. That is, the observer gains of the PI controllers 201 and 202 are equivalent to velocity control. As integral control is included, a function of adjusting the steady-state deviation of an output estimated value to zero is also included. There are no engineering costs required for approximation and gain adjustment in installing the observer 200.

A PI control observer based on a nonlinear dynamic model is expressed in a two-stage differential form shown in equations (7) generated by transforming equation (1). In equations (7), the symbol "^" indicates an estimated value.

$$\hat{\ddot{\theta}}_M = M_M^{-1}\{-D_M\hat{\dot{\theta}}_M - f_M\text{sgn}(\hat{\dot{\theta}}_M) + \qquad (7)$$

$$E_\tau - N_G\left[K_G(N_G\hat{\theta}_M - \hat{\theta}_L) + D_G(N_G\hat{\dot{\theta}}_M - \hat{\dot{\theta}}_L)\right]\}$$

$$\hat{\ddot{\theta}} = M_L(\hat{\theta}_L)^{-1}\left[-c_L(\hat{\theta}_L, \hat{\dot{\theta}}_L) - D_L\hat{\dot{\theta}} + K_G(N_G\hat{\theta}_M - \hat{\theta}_L) + \right.$$

$$\left. D_G(N_G\hat{\dot{\theta}}_M - \hat{\dot{\theta}}_L)\right]$$

$$\tau = K_{PV}(\dot{\theta}_M - \hat{\dot{\theta}}_M) + K_{IV}\int(\dot{\theta}_M - \hat{\dot{\theta}}_M)dt + u$$

In equations (7), $d\theta_M/dt = [d\theta_{M1}/dt, d\theta_{M2}/dt]^T$: a motor angular velocity input to the observer, $u = [u_1, u_2]^T$: an input (motor current command value) to the observer, $K_{PV} = \text{diag}(k_{PV1}, k_{PV2})$: velocity deviation proportionality control gain, $K_{IV} = \text{diag}(k_{IV1}, k_{IV2})$: velocity deviation integral control gain, and $\tau = [\tau_1, \tau_2]^T$: an input (motor current command value) to the observer.

Here, the same gains as those of P and I of the FF-I-P control (two-degree-of-freedom PI control) of the velocity loop of the actual robot are selected as the observer gains of the PI controllers 201 and 202. In this case, only the degree of freedom of the following properties of the observer is taken into consideration, and therefore, PI control having a feedforward system as a proportionality system, or FF=P, is set as PI control. This system is a type of nonlinear observer having a constant gain. Also, as integral control is included, the steady-state deviation of an output estimated value is made zero, and a function as an external disturbance removal observer is included.

The state observer expressed by equations (7) is installed in the robot control device 13, and a state can be estimated by performing integration twice in real time with the use of integrators shown in FIG. 5. The integration to be actually performed is numerical integration.

In angular velocity control of a two-inertia system, the angular velocities of the motors, the angular velocities of the links, and the three-state quantities of the axis torsion angular velocities of the motors and links, are fed back. In this manner, the poles can be set in desired positions, and readiness (the angle of the control system attaining a target value) and a damping rate can be freely set. However, this accompanies readjustment of the existing PI control systems, and therefore, it is difficult to perform the process. In view of this, state feedback is first performed only with estimated values of axis torsion angular velocities (the differences between the link angular velocities and the motor angular velocities) that are output from the observer 200. In the feedback of the axis torsion angular velocities, an effect to increase only the damping rate without changing the gain-crossover frequency of the PI control is expected (Non-Patent Document 2 (Sugimoto et al., THEORY AND ACTUAL DESIGN OF AC SERVO SYSTEM, Chapter 7, Design of Velocity control system and Position control system, Sougou-denshi-shuppansha, 1990, pp. 153-179)). Accordingly, manual adjustment at the work site is easy, and particularly, this observer is easily introduced into a control device for industrial robots.

Figure 6:
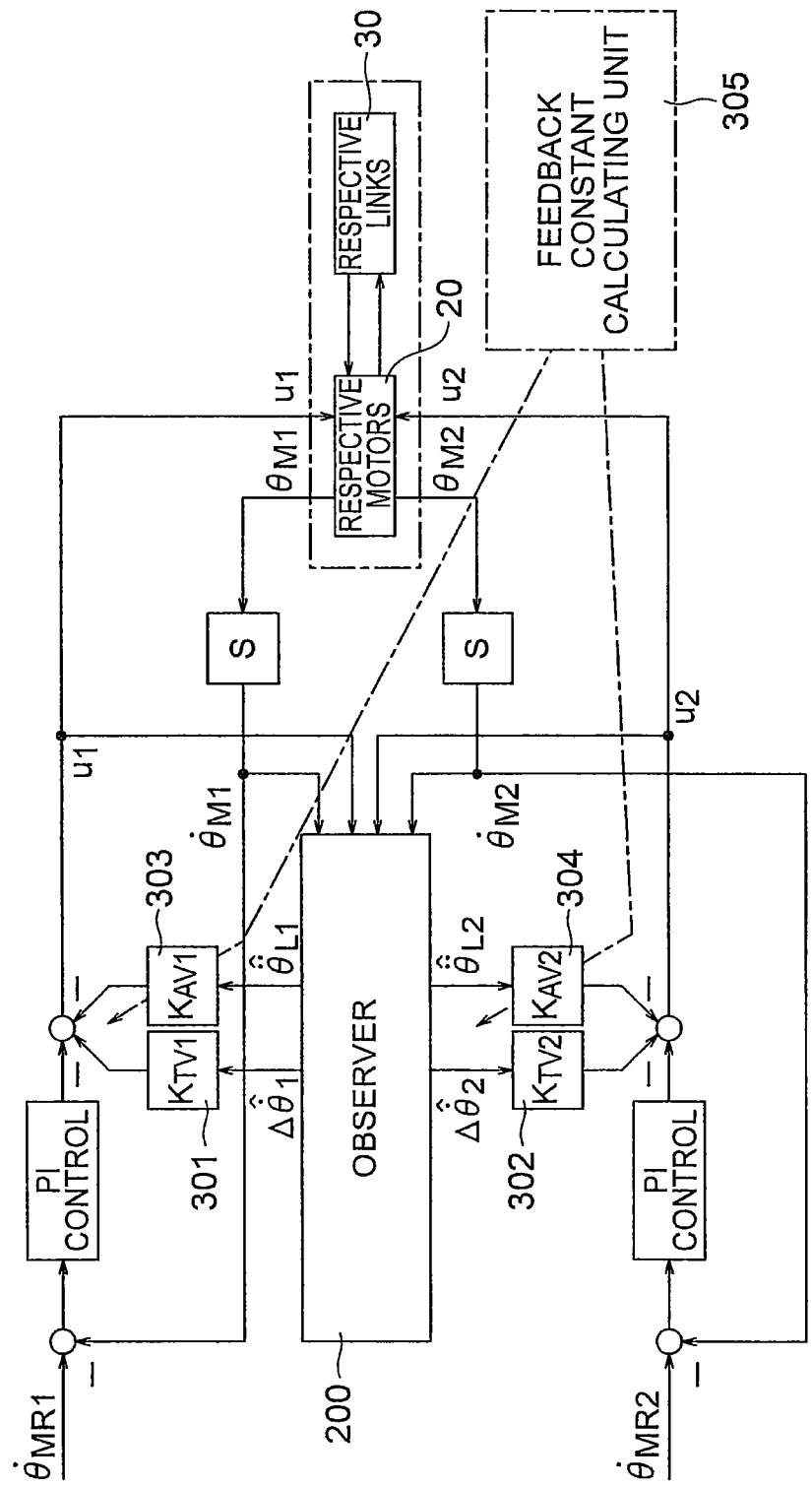
FIG. 6 is a block diagram showing the robot control device according to the first embodiment.

FIG. 6 is a block diagram of state feedback control using the observer 200 shown in FIG. 5. Motor angular velocities (encoder differences) and input voltages (current command values) for the motor drivers are input to the observer 200. State feedback units 301, 302, 303, and 304 that receive estimated values of axis torsion angular velocities about the first and second links from the PI control observer 200 can be realized by plugging those values into the two-degree-of-freedom PI control (FF-I-P control) shown in equations (7), and have the control law expressed by equation (8).

$$u_i = k_{FVi}\dot{\theta}_{MRi} + k_{IVi}\int(\dot{\theta}_{MRi} - \dot{\theta}_{Mi})dt - k_{PVi}\dot{\theta}_{Mi} - k_{TVi}(\hat{\dot{\theta}}_{Li}/n_{Gi} - \hat{\dot{\theta}}_{Mi}) \qquad (8)$$

$(i = 1, 2)$

The state feedback control gains $k_{TVi}$ (i=1, 2) of the estimated values of the axis torsion angular velocities can be easily subjected to manual adjustment with reference to time response waveforms. Since an observer based on an accurate nonlinear dynamic model of a robot arm having elastic joints is used, a sufficient effect can be achieved with state feedback only with respect to the first axis in vibration suppression control performed on a robot arm formed with serial links. Although a feedback constant calculating unit 305 for link angular accelerations to increase inertia is shown in FIG. 6, the function of the feedback constant calculating unit 305 will be described later.

Figure 7:
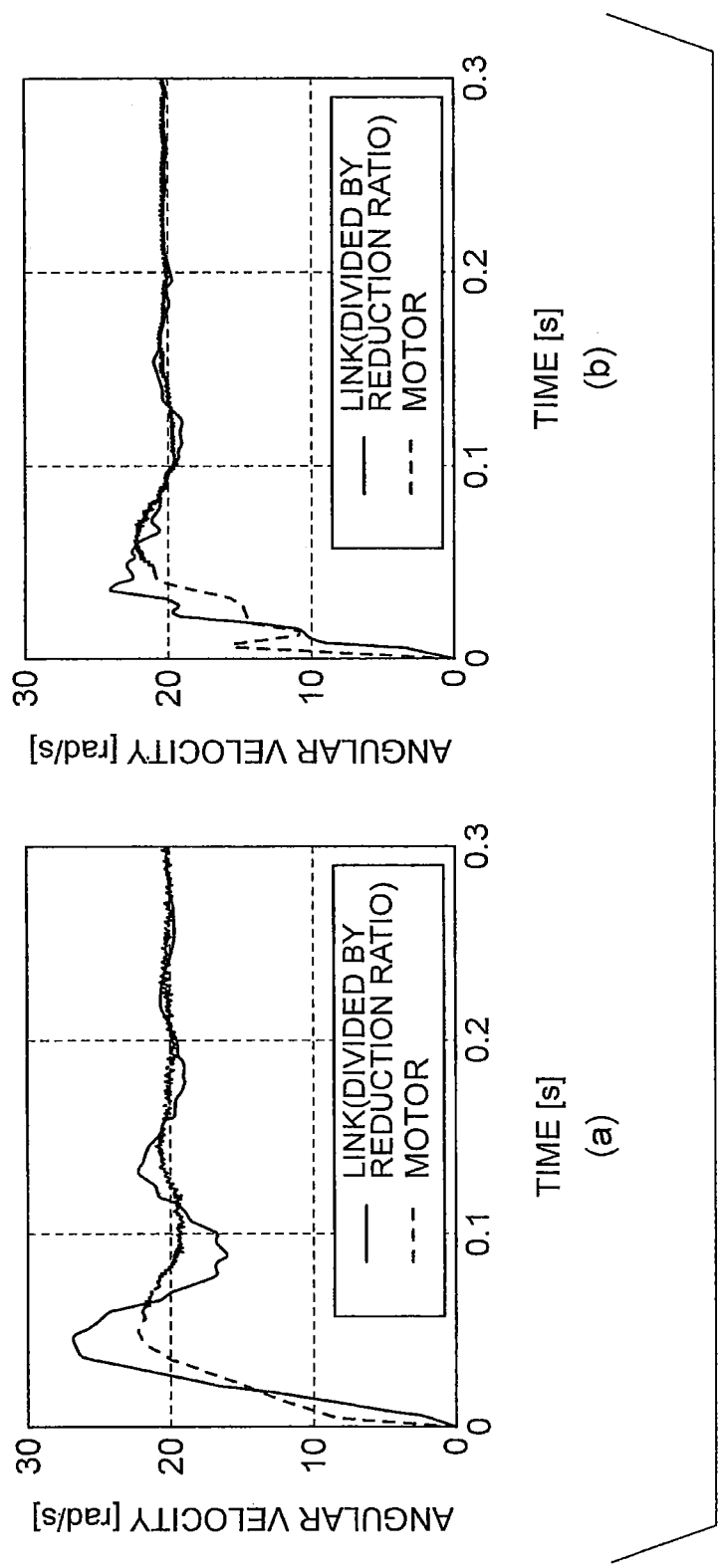
FIGS. 7(a) and 7(b) are diagrams showing an example of vibration suppression control according to the first embodiment.

FIGS. 7(a) and 7(b) respectively show the velocity step response waveform of the first axis in a case where the end effector load 12 is 5 kg and no axis torsion angular velocity feedback control is performed, and the velocity step response waveform of the first axis in a case where the end effector load 12 is 5 kg and axis torsion angular velocity feedback control is performed. In FIGS. 7(a) and 7(b), the waveforms of the link responses and the waveforms of the motor responses are adjusted to the same time axis, with the reduction ratio being taken into consideration. In the observer, a dynamic model having an end effector load of 5 kg is used. As can be seen from FIG. 7(a), the responses only under PI control (without any observer) are large in vibration amplitude, and are slow in damping. On the other hand, as can be seen from FIG. 7(b), the responses under control also involving feedback of axis torsion angular velocities (with an observer) are small in vibration amplitude, and are fast in damping. That is, the responses under control involving the feedback of axis torsion angular velocities shown in FIG. 7(b) have a much better link angular velocity response than the responses only under PI control shown in FIG. 7(a).

Figure 8:
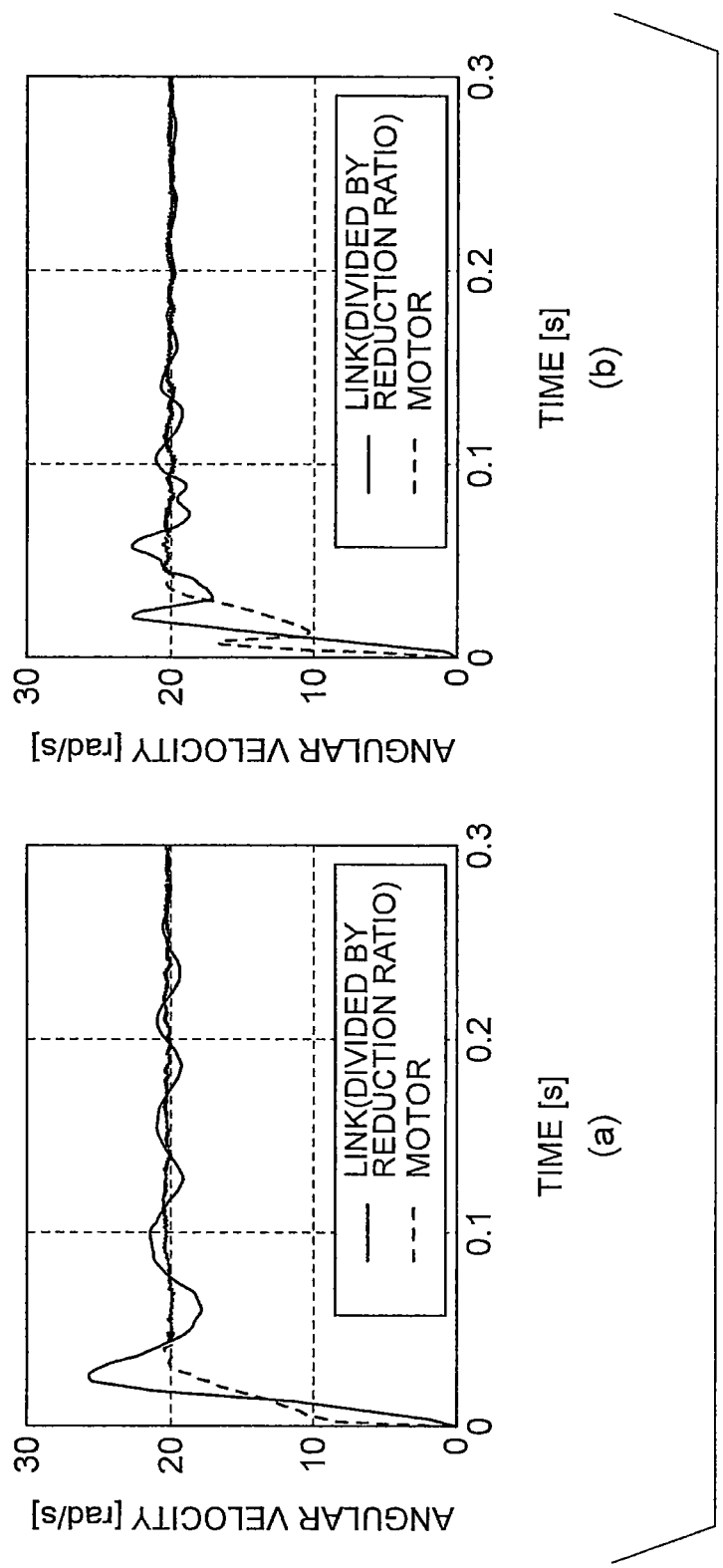
FIGS. 8(a) and 8(b) are diagrams showing another example of vibration suppression control according to the first embodiment.

FIGS. 8(a) and 8(b) respectively show the velocity step response waveform of the first axis in a case where no load is applied, or the end effector load 12 is 0 kg, and no axis torsion angular velocity feedback control is performed, and the velocity step response waveform of the first axis in a case where the end effector load 12 is 0 kg and axis torsion angular velocity feedback control is performed. In FIGS. 8(a) and 8(b), the waveforms of the link responses and the waveforms of the motor responses are adjusted to the same time axis, with the reduction ratio being taken into consideration. In the observer, a dynamic model in which the end effector load 12 is 0 kg is used. As can be seen from FIG. 8(a), the responses only under PI control (without any observer) are large in vibration amplitude, and are slow in damping. On the other hand, as can be seen from FIG. 8(b), the responses under control also involving feedback of axis torsion angular velocities (with an observer) are small in vibration amplitude, and are slow in damping at the rise time. That is, the responses under control involving the feedback of axis torsion angular velocities shown in FIG. 8(b) have a better link angular velocity response but have lower rise-time damping than the responses only under PI control shown in FIG. 8(a).

This is because, when the end effector load is small or when inertia is low, the damping effect of the vibration suppression control by feedback of axis torsion angular velocities becomes smaller. In other words, this is considered to be degradation of damping control performance due to a decrease in the inertia moment ratio between the link side and the motor side in the two-inertia system, or a decrease in inertia ratio (Non-Patent Document 3 (Takesue et al., A Consideration on Inertia-Ratio and Damping Property of Vibration of Two-Inertia System, IEEJ, D, Vol. 121, 2, 2001, pp. 283-284)).

In view of the above, this embodiment uses inertia increasing control so as to make the link-side inertia appear larger when the end effector load is small. The control law is formed by adding negative feedback of estimated values of link angular accelerations to equation (8) (the state feedback units 303 and 304 shown in FIG. 6), and is expressed as shown in equation (9).

$$u_i = k_{FVi}\dot{\theta}_{MRi} + k_{IVi}\int(\dot{\theta}_{MRi} - \dot{\theta}_{Mi})dt -$$
$$k_{PVi}\dot{\theta}_{Mi} - k_{TVi}(\hat{\theta}_{Li}/n_{Gi} - \hat{\dot{\theta}}_{Mi}) - k_{AVi}\hat{\ddot{\theta}}_{Li}$$

$(i = 1, 2)$ (9)

Here, the state feedback control gains $k_{AVi}$ of estimated values of angular accelerations have a link inertia moment dimension, and are considered to be capable of compensating the inertia variation $\Delta m$ of the end effector load of the robot arm. For example, when the inertia matrix in equation (3) is varied (reduced) by $\Delta m$, the base parameters $\alpha$, $\beta$, and $\gamma$ change to $\alpha'$, $\beta'$, and $\gamma'$, respectively, as shown in equations (10).

$\alpha' = \alpha - \Delta m$ $\beta' = \beta - \Delta m$ $\gamma' = \gamma - \Delta m$ (10)

If $\alpha'$, $\beta'$, and $\gamma'$ after the inertia variation of the end effector load of the robot arm expressed in equations (10) are assigned to the (1, 1) component of the inertia matrix in equation (3), equation (11) is obtained, with the reduction ratio $n_{G1}$ being taken into account.

$k_{AVi} = (2 + 2\cos(\theta_{L2}))\Delta m \times n_{G1}$ (11)

According to equation (11), the state feedback control gains of estimated values of angular accelerations of the first axis can be calculated. Equation (11) represents the function of the feedback constant calculating unit 305 shown in FIG. 6 for link angular accelerations to increase inertia.

Figure 9:
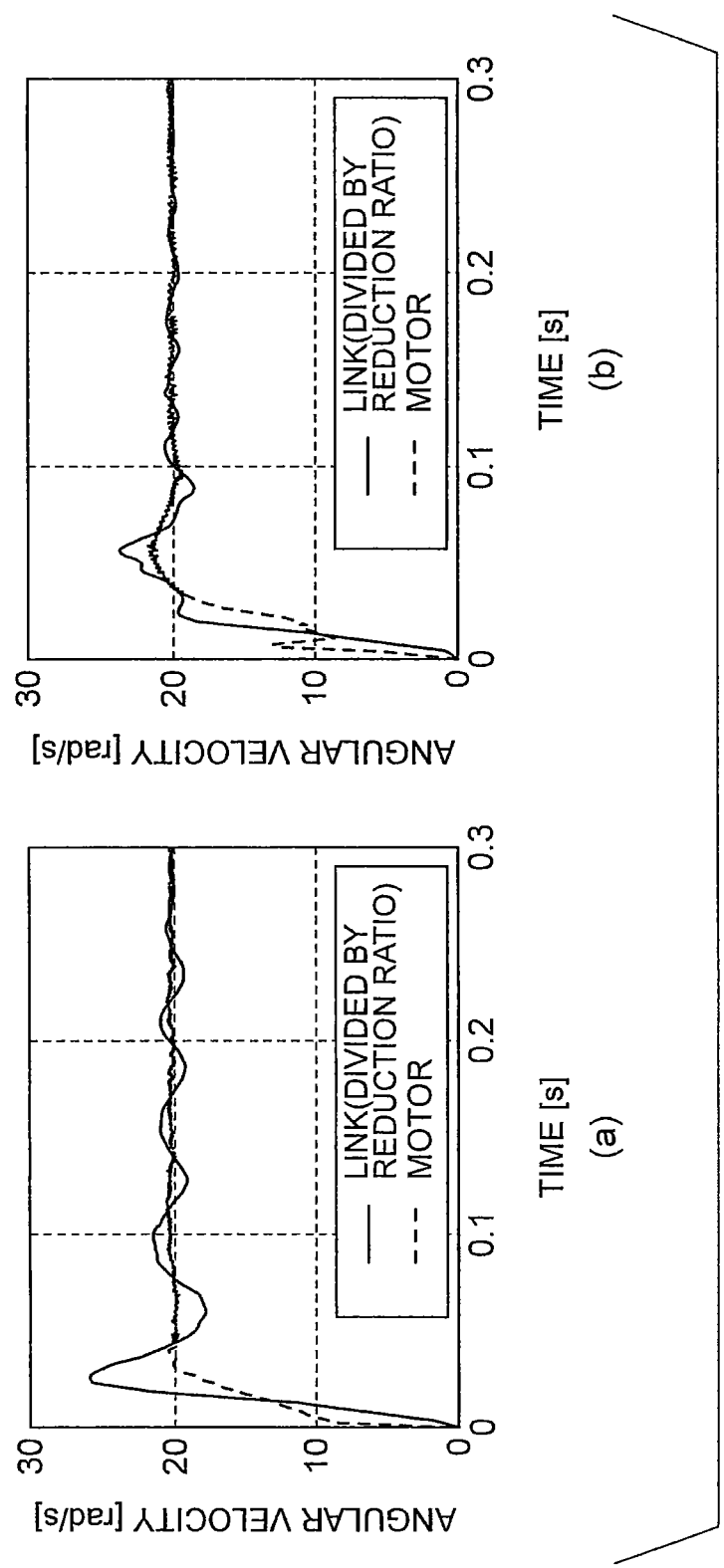
FIGS. 9(a) and 9(b) are diagrams showing the effect of vibration suppression control according to the first embodiment.

FIGS. 9(a) and 9(b) respectively show the velocity step response waveforms of the first axis in a case where the end effector load 12 is 0 kg and neither axis torsion angular velocity feedback control nor link angular acceleration feedback is performed, and the velocity step response waveforms of the first axis in a case where the end effector load 12 is 0 kg, and axis torsion angular velocity feedback control and link angular acceleration feedback are performed. In FIGS. 9(a) and 9(b), the waveforms of the link responses and the waveforms of the motor responses are adjusted to the same time axis, with the reduction ratio being taken into account. In the observer, a dynamic model in which the end effector load 12 is 0 kg is used. As can be seen from FIG. 9(a), the responses only under PI control (without any observer) are small in vibration amplitude, and are slow in damping at the rise time. On the other hand, as can be seen from FIG. 9(b), the waveforms in the case where axis torsion angular velocity feedback and link angular acceleration feedback are performed are small in vibration amplitude, and are fast in damping. That is, the link angular velocity response is much better in the case where axis torsion angular velocity feedback and link angular acceleration feedback are added as shown in FIG. 9(b), than in the case where only PI control is performed as shown in FIG. 8(a) and even in the case where only axis torsion angular velocity feedback is added as shown in FIG. 8(b). In the case shown in FIG. 9(b), an inertia increasing control effect is apparent.

Second Embodiment

Figure 10:
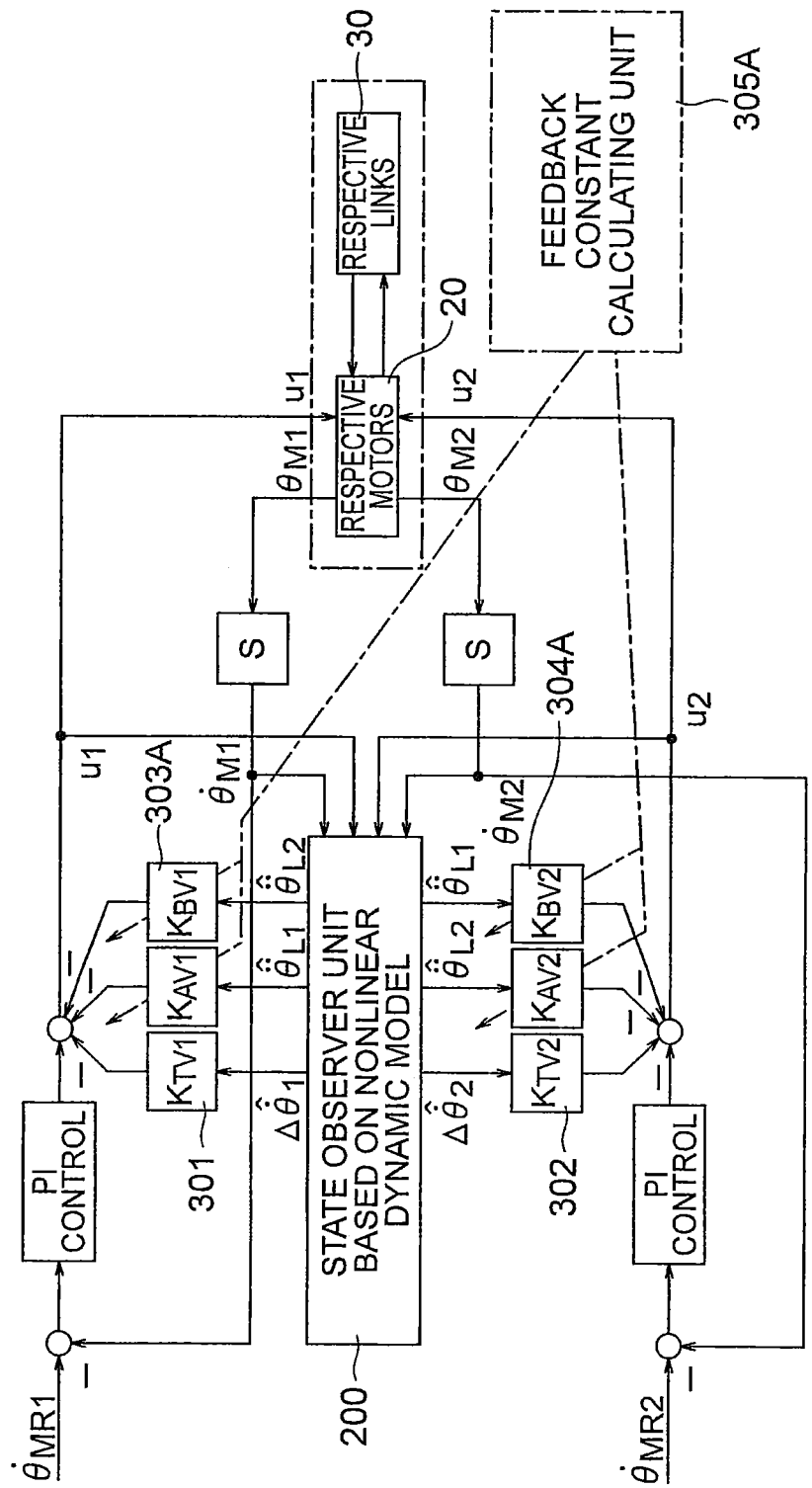
FIG. 10 is a block diagram showing the observer of a robot control device according to a second embodiment.

FIG. 10 shows a robot control device according to a second embodiment. This control device of the second embodiment has a function of controlling link angular acceleration feedback through increases and stabilization of inertia, and a function of calculating the gain of the feedback control.

The decreases in inertia described above occur not only when the end effector load is small but also when the posture of the robot arm changes. In a two-link robot arm, for example, the inertia around the first axis decreases as the angle of the second axis becomes larger. In view of this, decreases in inertia due to postural changes are to be compensated by link angular acceleration feedback.

If an inertia decrease from the maximum value of the (1, 1) components of the inertia matrix shown in equation (3) is taken into account in a two-link robot arm, equation (12) is established.

$k_{AVi} = 2\gamma(1 - \cos(\theta_{L2}))n_{G1}$ (12)

According to equation (12), the control gain of feedback of a link angular acceleration of the first axis can be calculated. Through this feedback, constant inertia is maintained regardless of postures of the arm, or inertia fixing control is realized, and a vibration suppressing effect equal to the above described inertia increasing control is achieved.

It is possible to use the inertia fixing control and the inertia increasing control of the first embodiment at the same time. Where equation (11) and equation (12) are combined, equation (13) is obtained.

$$k_{AVi}=[(2+2\cos(\theta_{2L})\Delta m+2\gamma(1-\cos(\theta_{L2})))]n_{G1} \quad (13)$$

According to equation (13), the feedback control gains of link angular accelerations by virtue of the inertia increasing and fixing control on the first axis can be calculated. This is the function of a feedback constant calculating unit 305A shown in FIG. 10 for link angular accelerations using inertia increasing and fixing control.

Further, when attention is focused on the off-diagonal elements of the inertia matrix shown in equation (3), the feedback control gains $k_{BV1}$ and $k_{BV2}$ of link angular accelerations through control for higher and constant inertia can be calculated with respect to the (1, 2) component and the (2, 1) component, as shown in equations (14) and (15).

$$k_{BV1}=[(1+\cos(\theta_{2L})\Delta m+\gamma(1-\cos(\theta_{L2})))]n_{G1} \quad (14)$$

$$k_{BV2}=[(1+\cos(\theta_{2L})\Delta m+\gamma(1-\cos(\theta_{L2})))]n_{G1} \quad (15)$$

With the use of $k_{BV1}$ and $k_{BV2}$, the feedback of the angular acceleration of the second axis is added to the first axis in equation (9), and the feedback of the angular acceleration of the first axis is added to the second axis in equation (9), equation (16) is obtained.

$$u_i = k_{FVi}\dot{\theta}_{MRi} + k_{IVi}\int\left(\dot{\theta}_{MRi} - \dot{\theta}_{Mi}\right)dt - \quad (16)$$

$$k_{PVi}\theta_{Mi} - k_{TVi}\left(\hat{\theta}_{Li}/n_{Gi} - \hat{\theta}_{Mi}\right) - k_{AVi}\hat{\ddot{\theta}}_{Li} - k_{BVi}\hat{\ddot{\theta}}_j$$

$$(i=1,2, j=2,1)$$

In this manner, a vibration suppression control system that further performs generalized control for higher inertia and constant inertia is obtained. FIG. 10 is a block diagram of the entire vibration suppression control system that further performs control for higher inertia and constant inertia.

Third Embodiment

Figure 11:
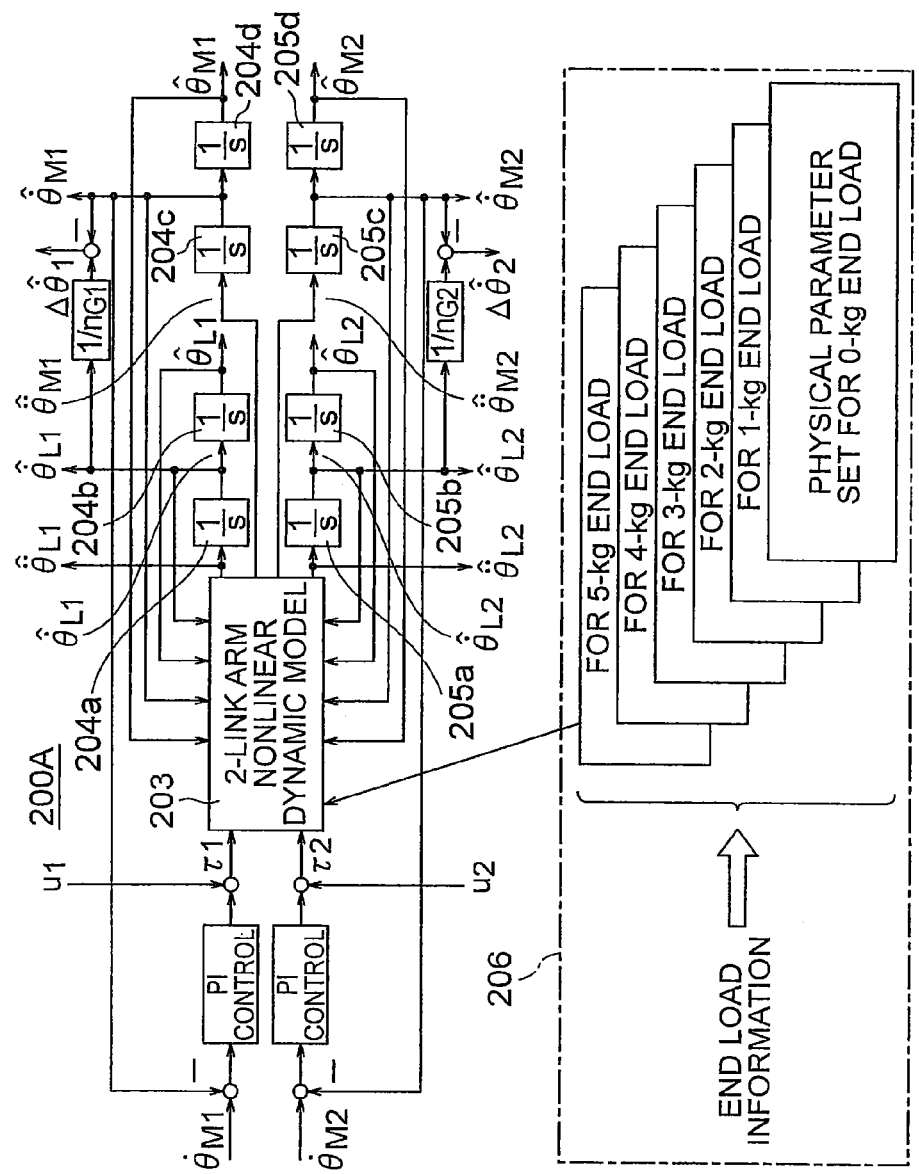
FIG. 11 is a block diagram showing the observer of a robot control device according to a third embodiment.

FIG. 11 shows an observer of a robot control device according to a third embodiment. The observer 200A of the third embodiment is the same as the observer 200 of the first embodiment shown in FIG. 5, except for further including a physical parameter switching unit 206. As shown in FIG. 11, the observer 200A of the third embodiment performs switching (gain scheduling) of the physical parameter set for a nonlinear dynamic model 203 with the physical parameter switching unit 206 with respect to an end effector load variation and the friction force variation accompanying the end effector load variation, so that the vibration suppression performance becomes robust regardless of variations of the end effector load and the friction force in the robot. To switch the physical parameter set explicitly, a robot language such as "Payload (5 kg)" is input, for example, and is used when the end effector load varies. The physical parameter set includes a mass, a moment of inertia, a friction coefficient, a spring coefficient, and the like.

In the example shown in FIG. 11, the physical parameter switching unit 206 requires six physical parameter sets for the end effector loads of 5 kg, 4 kg, 3 kg, 2 kg, 1 kg, and 0 kg. However, as long as the physical parameter set for 5 kg is accurately estimated, the physical parameter set for the end effector load of 4 kg can be generated by the above described optimization technique using the nonlinear least-squares method. In the same manner, the physical parameter set for 3 kg can be generated from that for 4 kg, the physical parameter set for 2 kg can be generated from that for 3 kg, the physical parameter set for 1 kg can be generated from that for 2 kg, and the physical parameter set for 0 kg can be generated from that for 1 kg.

Fourth Embodiment

Figure 12:
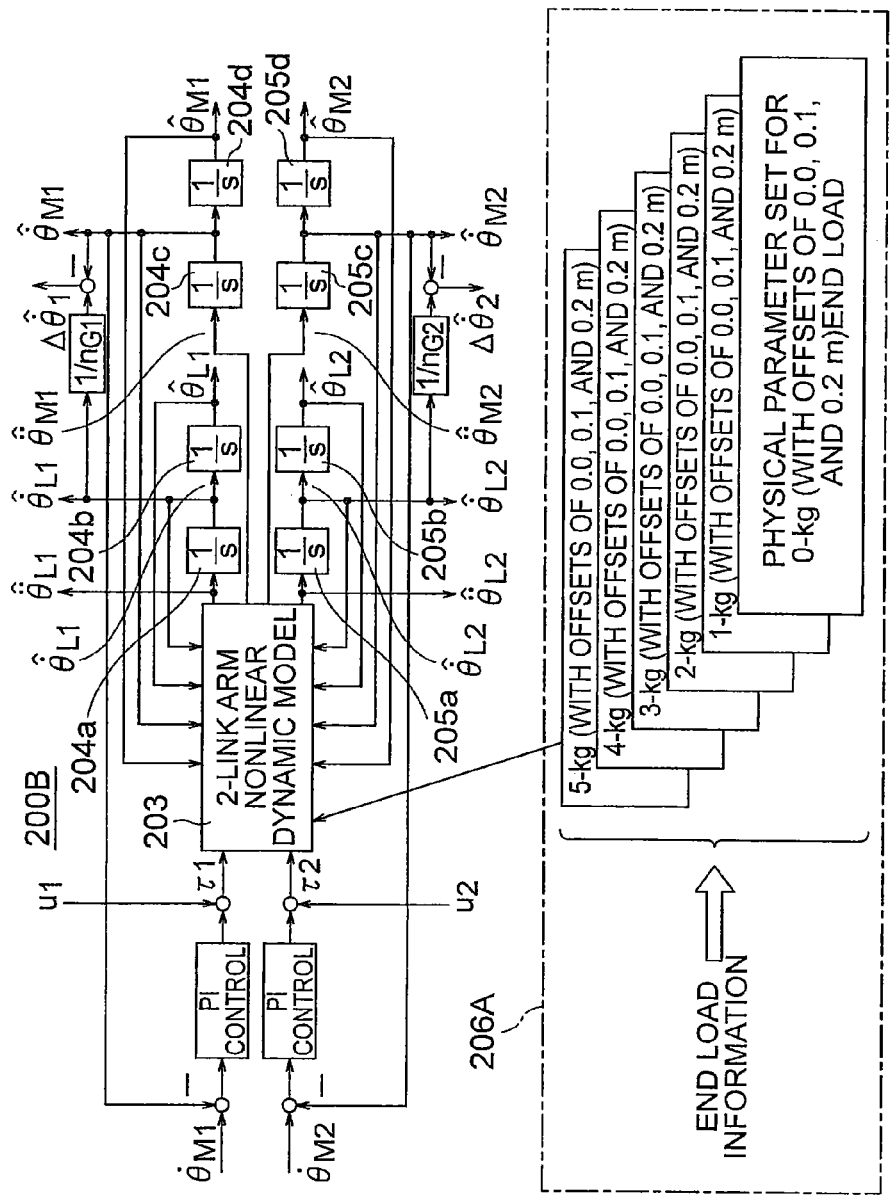
FIG. 12 is a block diagram showing the observer of a robot control device according to a fourth embodiment.

FIG. 12 shows an observer of a robot control device according to a fourth embodiment. This observer 200B of the fourth embodiment is the same as the observer 200 of the first embodiment shown in FIG. 5, except for further including a physical parameter switching unit 206A. This observer 200B of the fourth embodiment takes into account cases where there is an offset at the application position of an end effector load. In this case, the inertia moment of the end effector load greatly varies. Therefore, as shown in FIG. 12, the physical parameter switching unit 206A performs physical parameter scheduling, taking into account offsets (such as the following three types: 0.0 m, 0.1 m, and 0.2 m). A robot language such as "Payload (5 kg, 0.1 m)" is input, for example, and is used when the end effector load varies. Each physical parameter includes a mass, a moment of inertia, a friction coefficient, a spring coefficient, and the like, as in the third embodiment shown in FIG. 11.

Fifth Embodiment

Figure 13:
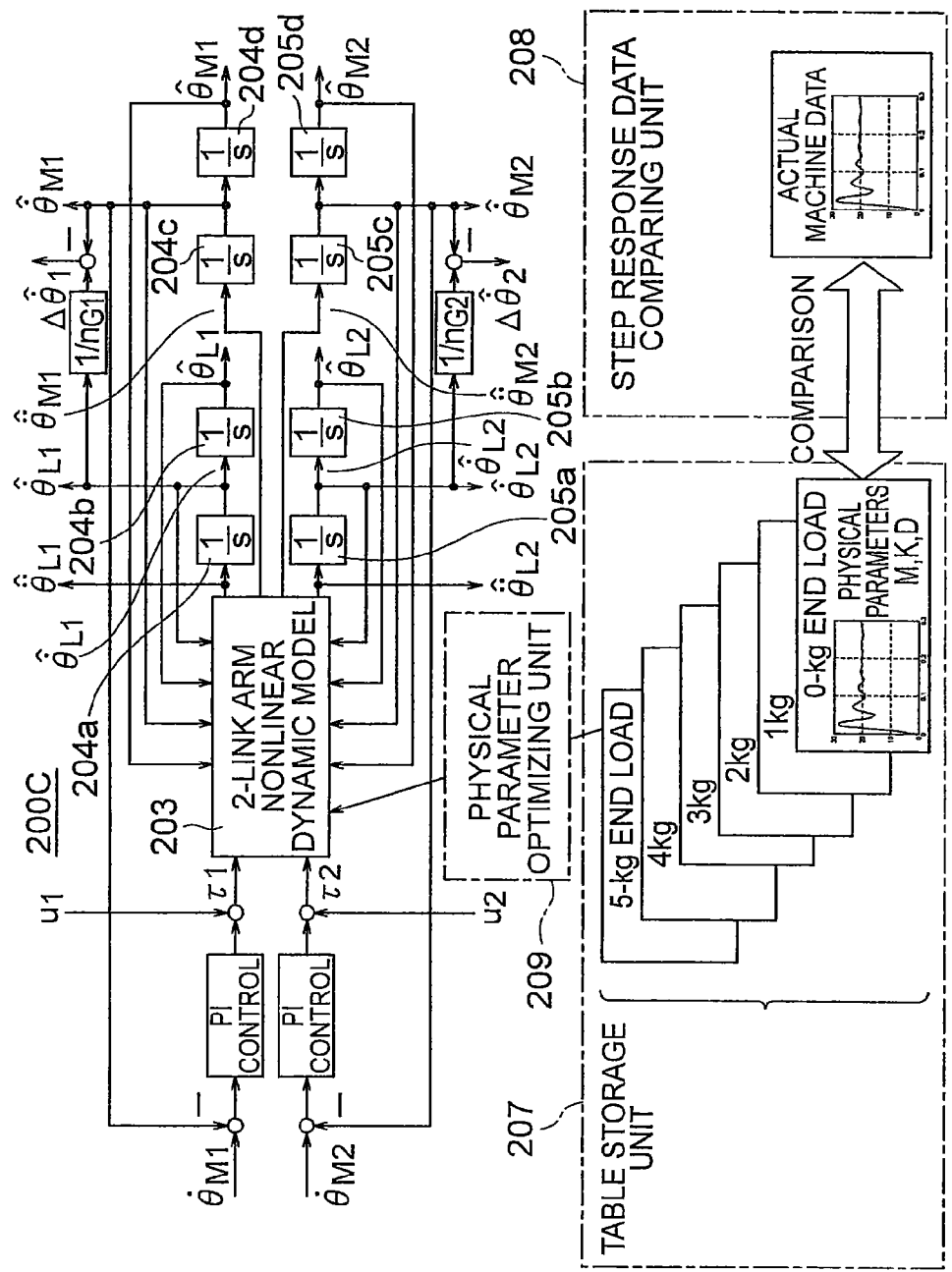
FIG. 13 is a block diagram showing the observer of a robot control device according to a fifth embodiment.

FIG. 13 shows an observer of a robot control device according to a fifth embodiment. This observer 200C of the fifth embodiment differs from the observer 200 of the first embodiment shown in FIG. 5, in further including a table storage unit 207, a step response data comparing unit 208, and a physical parameter optimizing unit 209. This observer 200C of the fifth embodiment may have an end effector load that deviates from a numerical value such as 5 kg, 4 kg, 3 kg, 2 kg, 1 kg, or 0 kg. In FIG. 13, the table storage unit 207 is prepared for storing velocity step response data of respective masses (5 kg, 4 kg, 3 kg, 2 kg, 1 kg, and 0 kg) of end effector loads acquired in advance, and the physical parameter sets corresponding to the masses.

First, velocity step response data of an actual machine having an unknown end effector load is acquired. At the step response data comparing unit 208, the acquired velocity step response data is compared with the velocity step response data of the respective end effector loads stored in the table storage unit 207. Based on the results of the comparisons, the end effector load closest to the end effector load corresponding to the velocity step response data of the actual machine is selected from among the end effector loads of, for example, 5 kg, 4 kg, 3 kg, 2 kg, 1 kg, and 0 kg, which are stored in the table storage unit 207. The physical parameter set corresponding to the selected end effector load is set as initial values. In selecting the end effector load closest to the end effector load corresponding to the velocity step response data of the actual machine, the end effector load that minimizes the sum of the squares of the differences between the velocity step response data of the actual machine and the velocity step response data of the respective end effector loads stored in the table storage unit 207 is selected.

Further, the physical parameter optimizing unit 209 performs an optimization calculation by using the above described physical parameter set selected as the initial values. This optimization calculation is exactly the same as the above described technique using the nonlinear least-squares method. In this manner, an accurate physical parameter set can be obtained even for an unknown end effector load. Accordingly, a high-precision observer can be constructed, and effective vibration suppression control can be provided.

As described above, according to each of the embodiments, the engineering costs of an observer that estimates a link angular velocity from a motor angular velocity can be dramatically lowered in the vibration suppression control for the end of a multi-link robot arm. Furthermore, even if the end effector load and the friction force of the robot vary, robust vibration suppression performance can be realized.

The mechanism in which the existing velocity PI control systems do not need to be re-tuned and do return to the original PI control systems when the additional feedbacks such as vibration suppression control and inertia increasing control are separated therefrom, satisfies the needs at the work site.

A configuration in which an entire simulator of this embodiment based on a nonlinear dynamic model is included in a control device may be used in the field of process control with a time axis 100 or more times greater than that of a robot. However, this method aims to perform future set-point control (for liquid level, pressure, temperature or the like) in an optimum manner so as to save energy, and is not suitable for servo control for achieving target-value following performance in real time with a robot or the like.

By the methods disclosed in JP 2005-120212A and the like, an observer based on some kind of approximation in a nonlinear dynamic model is used. Therefore, robust vibration control performance cannot be achieved in a wide operating range, even though champion data can be obtained. Furthermore, the engineering costs for a reduction in calculation amount and adjustment of observer gains become higher.

Motor drive makers have suggested many other techniques such as a vibration suppression control technique and adaptive control and auto tuning techniques for the vibration suppression control. However, those techniques are based on general-purpose observers that use an elastic joint model and external disturbance estimation for each link regarded as a load on a motor, and therefore, are of course inferior in performance to a technique that regards a mufti-link robot arm dynamic model explicitly.

In this embodiment, on the other hand, an observer that is based on a nonlinear dynamic model and has no approximation is used, and physical parameter gain scheduling is also performed in accordance with variations in end effector load and friction force. Accordingly, robust vibration control performance can be achieved in a wide operating range. Furthermore, variations in friction force caused by variations in end effector load are also taken into account, and gain scheduling is also performed on friction coefficients as well as masses and inertias. Also, since there is no need to design observer gains, no engineering costs are required, which is a great advantage over conventional techniques.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A robot control device that controls a robot arm having an elastic mechanism between a rotation axis of a motor and a rotation axis of a link, and has an angular velocity control system that performs proportionality/integration control on an angular velocity of the motor and outputs a current command value to the motor, the robot control device comprising:
an observer configured to receive the angular velocity of the motor and the current command value as inputs, have a nonlinear dynamic model of the robot arm, and estimate an angular acceleration of the link, an angular velocity of the link, and an angular velocity of the motor from a simulation model of an angular velocity control system of the motor subjected to proportionality/integration control using a gain equivalent to the angular velocity control system;
a first feedback unit configured to calculate an axis torsion angular velocity from a difference between the angular velocity of the link estimated by the observer and the angular velocity of the motor estimated by the observer, and give feedback to the angular velocity control system;
a second feedback unit that feeds back the angular acceleration of the link estimated by the observer to the angular velocity control system; and
a first feedback constant calculating unit that compensates an end effector load mass and increases inertia at the second feedback unit when an end effector load in the nonlinear dynamic model has low inertia.

2. The device according to claim 1, further comprising a second feedback constant calculating unit configured to compensate a decrease in inertia caused by a postural change in the robot arm, and cause the inertia to be constant regardless of the postural change at the second feedback unit.

3. The device according to claim 1, further comprising a physical parameter switching unit configured to switch physical parameter sets in accordance with a classification of a mass of an end effector load of the robot arm, each of the physical parameter sets including a moment of inertia, a friction coefficient, and a spring coefficient that are set in the nonlinear dynamic model.

4. The device according to claim 1, further comprising a physical parameter switching unit configured to switch physical parameter sets in accordance with a classification of a mass of an end effector load of the robot arm and a classification of an offset at a location of the end effector load, each of the physical parameter sets including a moment of inertia, a friction coefficient, and a spring coefficient that are set in the nonlinear dynamic model.

5. The device according to claim 1, wherein the physical parameter switching unit includes:
a table storage unit configured to store velocity step response data of respective end effector load masses prepared in advance, and physical parameters used in acquiring the velocity step response data;
a step response data comparing unit configured to compare velocity step response data of the robot arm with the velocity step response data stored in the table storage unit, and select initial values of the physical parameters based on a result of the comparison; and a physical parameter optimizing unit configured to acquire the velocity step response data of the robot arm, compare the acquired velocity step response data with the velocity step response data of the respective end effector load masses stored in the table storage unit, estimate initial values of physical parameters based on a result of the comparison, perform a nonlinear optimization calculation by using the estimated initial values of the physical parameters to adjust a simulation step response waveform of the robot to a real step response waveform of the robot, and optimize the physical parameters.

6. The device according to claim 5, wherein the physical parameter optimizing unit selects an end effector load that has the smallest sum of squares of differences between the acquired velocity step response data and the velocity step response data of the respective end effector load masses among the end effector loads stored in the table storage unit, and estimates physical parameters corresponding to the selected end effector load as the initial values of the physical parameters.

* * * * *